United States Patent
Kanteti et al.

(10) Patent No.: US 11,935,343 B2
(45) Date of Patent: Mar. 19, 2024

(54) ACCESS CONTROL SYSTEM WITH SENSOR

(71) Applicant: Carrier Corporation, Palm Beach Gardens, FL (US)

(72) Inventors: Neeraja Kanteti, Hyderabad (IN); Adam Kuenzi, Silverton, OR (US)

(73) Assignee: Carrier Corporation, Palm Beach Gardens, FL (US)

( * ) Notice: Subject to any disclaimer, the term of this patent is extended or adjusted under 35 U.S.C. 154(b) by 2 days.

(21) Appl. No.: 17/671,237

(22) Filed: Feb. 14, 2022

(65) Prior Publication Data

US 2022/0172531 A1 Jun. 2, 2022

Related U.S. Application Data

(63) Continuation of application No. 17/254,965, filed as application No. PCT/US2019/059786 on Nov. 5, 2019, now Pat. No. 11,250,654.

(60) Provisional application No. 62/756,232, filed on Nov. 6, 2018.

(51) Int. Cl.
| | |
|---|---|
| H04N 5/44 | (2011.01) |
| G07C 9/00 | (2020.01) |
| G07C 9/28 | (2020.01) |

(52) U.S. Cl.
CPC ........... *G07C 9/00309* (2013.01); *G07C 9/28* (2020.01)

(58) Field of Classification Search
CPC .. G07C 9/00309; G07C 9/28; G07C 2209/63; H04W 52/0254
See application file for complete search history.

(56) References Cited

U.S. PATENT DOCUMENTS

| | | | |
|---|---|---|---|
| 8,222,993 B2 | 7/2012 | Bliding et al. | |
| 8,400,269 B2 * | 3/2013 | Tuttle | G06K 7/10316 340/568.1 |
| 9,208,674 B2 | 12/2015 | Liao | |
| 9,483,887 B1 * | 11/2016 | Soleimani | G07C 9/00309 |
| 9,574,375 B2 | 2/2017 | Henderson | |
| 10,249,122 B1 * | 4/2019 | Aksamít | G07C 9/00309 |
| 2006/0190750 A1 | 8/2006 | Maggi et al. | |
| 2009/0009295 A1 * | 1/2009 | Rofougaran | H04B 5/0012 340/10.1 |
| 2009/0153290 A1 * | 6/2009 | Bierach | H04L 9/32 340/5.6 |
| 2010/0307206 A1 | 12/2010 | Taylor et al. | |

(Continued)

FOREIGN PATENT DOCUMENTS

| | | |
|---|---|---|
| CN | 106056712 A | 10/2016 |
| CN | 106408723 A | 2/2017 |
| CN | 104794782 B | 4/2017 |
| KR | 100367300 B1 | 1/2003 |
| KR | 20030033849 A | 5/2003 |
| WO | 2014092259 A1 | 6/2014 |

(Continued)

OTHER PUBLICATIONS

International Search Report dated Feb. 13, 2020 for International Patent Application No. PCT/US2019/059786.

(Continued)

*Primary Examiner* — Munear T Akki
(74) *Attorney, Agent, or Firm* — Bachman & LaPointe, P.C.

(57) ABSTRACT

A method of changing a rate of advertising for at least one of a multiple of access controls, including transmitting advertisements from an access control at a nominal rate and changing the nominal rate in response to detection by a sensor.

20 Claims, 5 Drawing Sheets

(56) References Cited

U.S. PATENT DOCUMENTS

| | | | |
|---|---|---|---|
| 2012/0077431 A1* | 3/2012 | Fyke | H04W 4/80 |
| | | | 455/41.1 |
| 2013/0027180 A1* | 1/2013 | Lakamraju | G07C 9/257 |
| | | | 340/5.52 |
| 2013/0176107 A1 | 7/2013 | Dumas et al. | |
| 2015/0161834 A1 | 6/2015 | Spahl et al. | |
| 2015/0181014 A1 | 6/2015 | Gerhardt et al. | |
| 2015/0199859 A1* | 7/2015 | Ouyang | H04L 9/30 |
| | | | 340/5.61 |
| 2016/0171808 A1* | 6/2016 | Caterino | G07C 9/20 |
| | | | 340/5.61 |
| 2017/0109952 A1 | 4/2017 | Johnson | |
| 2017/0228953 A1* | 8/2017 | Lupovici | G07C 9/00896 |
| 2017/0294061 A1 | 10/2017 | Shin et al. | |
| 2019/0387473 A1 | 12/2019 | Lang et al. | |

FOREIGN PATENT DOCUMENTS

| | | |
|---|---|---|
| WO | 2016196025 A1 | 12/2016 |
| WO | 2018160343 A1 | 9/2018 |

OTHER PUBLICATIONS

Ju, et al; "Combined RFID with sensor or motion detect for security system"; Proceedings of the 2007 WSEAS Int. Conference on Circuits, Systems, Signal and Telecommunications, Gold Coast, Australia; Jan. 17-19, 2007; pp. 221-225.

Dabhade, J. et al.; "Smart Door Lock System: Improving Home Security Using Bluetooth Technology"; International Journal of Computer Applications (0975-8887); vol. 160; No. 8; Feb. 2017.

* cited by examiner

| MODE | RATE | BATTERY LIFE |
|---|---|---|
| NOMINAL | 1/SEC | 2.5 YEARS |
| FOUR TIMES AS FAST | 4/SEC | 1.6 YEARS |
| HALF AS FAST | 1 EVERY 2 SECONDS | 2.8 YEARS |
| 4 HOURS AT 4X, 4 HOURS AT NOMINAL, 16 HOURS AT HALF | DYNAMIC PERFORMANCE | 2.55 YEARS (BETTER THAN NOMINAL WITH PERIODS OF BETTER PERFORMANCE) |

FIG. 5

ACCESS CONTROL SYSTEM WITH SENSOR

CROSS-REFERENCE TO RELATED APPLICATIONS

This application is a Continuation of U.S. patent application Ser. No. 17/254,965, filed Dec. 22, 2020, which is a 371 of PCT/US2019/059786, filed Nov. 5, 2019, which claims benefit of provisional application 62/756,232 filed Nov. 6, 2018.

BACKGROUND

The present disclosure relates generally to access control systems, and more particularly, to a system and a method to increase performance without decreasing battery life.

Various mobile devices have been utilized to open locks via an infrared communication to the lock, which provides directionality, or a 'push the button' to wake the lock for subsequent communication over Bluetooth. With the capability present in Bluetooth Low Energy (BTLE) to communicate with very low power, the lock can be 'always on' and sending periodic Bluetooth low energy (BTLE) communications so that the lock may be opened without requiring a wake-up procedure.

However, in order to minimize the impact on the battery life, the communication rate for a Bluetooth low energy (BTLE) device must be slowed down to a point to where the operational current draw is acceptable for a given battery life expectancy. The rate at which a connectable device sends Bluetooth low energy (BTLE) communications directly affects the time required to connect because after a person indicates an intent to open a lock with their mobile device, the mobile device must wait for the next communication before a connection is established. This leads to a trade-off in performance for how fast the lock opens versus battery life.

SUMMARY

A method of changing a rate of advertising from an access control according to one disclosed non-limiting embodiment of the present disclosure includes transmitting Bluetooth low energy (BTLE) communications receivable by a mobile device from an access control at a communication rate corresponding to a slow rate; and changing the slow rate in response to detection of a person by a sensor in communication with the access control, wherein changing the slow rate in response to the detection comprises changing the communication rate.

A further embodiment of any of the foregoing embodiments of the present disclosure includes that changing the slow rate in response to the detection comprises increasing the communication rate.

A further embodiment of any of the foregoing embodiments of the present disclosure includes that the detection comprises a video input.

A further embodiment of any of the foregoing embodiments of the present disclosure includes that the detection comprises an input from a security camera.

A further embodiment of any of the foregoing embodiments of the present disclosure includes that changing the slow rate in response to the detection comprises changing the slow rate to a faster rate for a predefined period of time.

A further embodiment of any of the foregoing embodiments of the present disclosure includes that changing the slow rate in response to the detection comprises changing the slow rate to a nominal rate for a predefined period of time.

A further embodiment of any of the foregoing embodiments of the present disclosure includes reverting to the slow rate after predefined period of time subsequent to the detection.

A further embodiment of any of the foregoing embodiments of the present disclosure includes reverting to the slow rate after an access control unlock event.

A further embodiment of any of the foregoing embodiments of the present disclosure includes changing to a nominal rate between the slow rate and a fast rate after a time period subsequent to the detection, prior to reverting to the slow rate after a time period subsequent to the detection.

A further embodiment of any of the foregoing embodiments of the present disclosure includes that the sensor is in communication with the access control via Bluetooth low energy (BTLE).

A further embodiment of any of the foregoing embodiments of the present disclosure includes that the sensor is in communication with a multiple of access controls.

A further embodiment of any of the foregoing embodiments of the present disclosure includes that the multiple of access controls are located in a hallway.

A further embodiment of any of the foregoing embodiments of the present disclosure includes locating the sensor adjacent to an elevator.

An access control system according to one disclosed non-limiting embodiment of the present disclosure includes a sensor operable to detect motion; and an access control in communication with the sensor, the access control operable to transmit Bluetooth low energy (BTLE) communications receivable by a mobile device at a nominal rate and at least one other rate different than the nominal rate in response to the sensor.

A further embodiment of any of the foregoing embodiments of the present disclosure includes that the access control is one of a multiple of access controls.

A further embodiment of any of the foregoing embodiments of the present disclosure includes that the multiple of access controls are located along a hallway.

A further embodiment of any of the foregoing embodiments of the present disclosure includes locating the sensor adjacent to an elevator.

A further embodiment of any of the foregoing embodiments of the present disclosure includes that the sensor is a security camera.

A further embodiment of any of the foregoing embodiments of the present disclosure includes that the sensor is in communication with the access control via Bluetooth low energy (BTLE).

A further embodiment of any of the foregoing embodiments of the present disclosure includes that the sensor is within the access control.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 5 is a chart comparing example rates of advertising.

DETAILED DESCRIPTION

Figure 1:
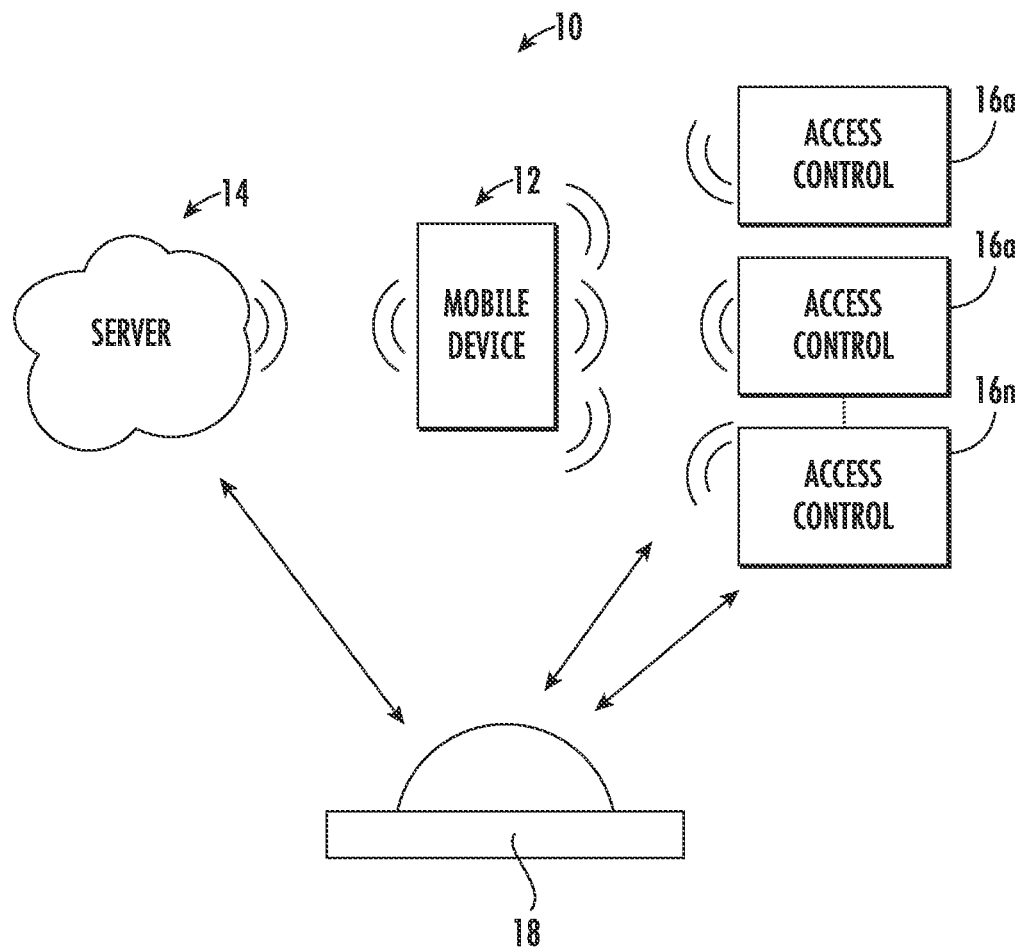
FIG. 1 is a general schematic system diagram of an access control system.

FIG. 1 schematically illustrates an access control system 10. The system 10 generally includes a mobile device 12, a server 14, a plurality of access controls 16, schematically illustrated as 16a, 16b, . . . , 16n and a sensor 18. It should be appreciated that, although particular systems are separately defined in the schematic block diagrams, each or any of the systems may be otherwise combined or separated via hardware and/or software.

The mobile device 12 is a wireless capable handheld device such as a smartphone, which is operable to communicate with the server 14 and the access controls 16. The server 14 may provide credentials and other data to the mobile device 12, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data.

Each access control 16 is a wireless-capable, restricted-access, or restricted-use device such as wireless locks, access control readers for building entry, electronic banking controls, data transfer devices, key dispenser devices, tool dispensing devices, and other restricted-use machines. The mobile device 12 submits credentials to the access controls 16, thereby selectively permitting a user to access or activate functions of the access controls 16. A user may, for example, submit a credential to an electromechanical lock to unlock it, and thereby gain access to a restricted area. In another example, a user may submit a credential to an electronic banking control to withdraw funds. In still another example, the user may submit the credential to a unit that dispenses key cards with data associated with or data retrieved from the credential. A mobile device 12 may store credentials for one or all or other of the examples noted above, and in addition may store a plurality of credentials for each type of application at the same time. Some credentials may be used for multiple access controls 16. For example, a plurality of electronic locks in a facility may respond to the same credential. Other credentials may be specific to a single access control 16.

Figure 2:
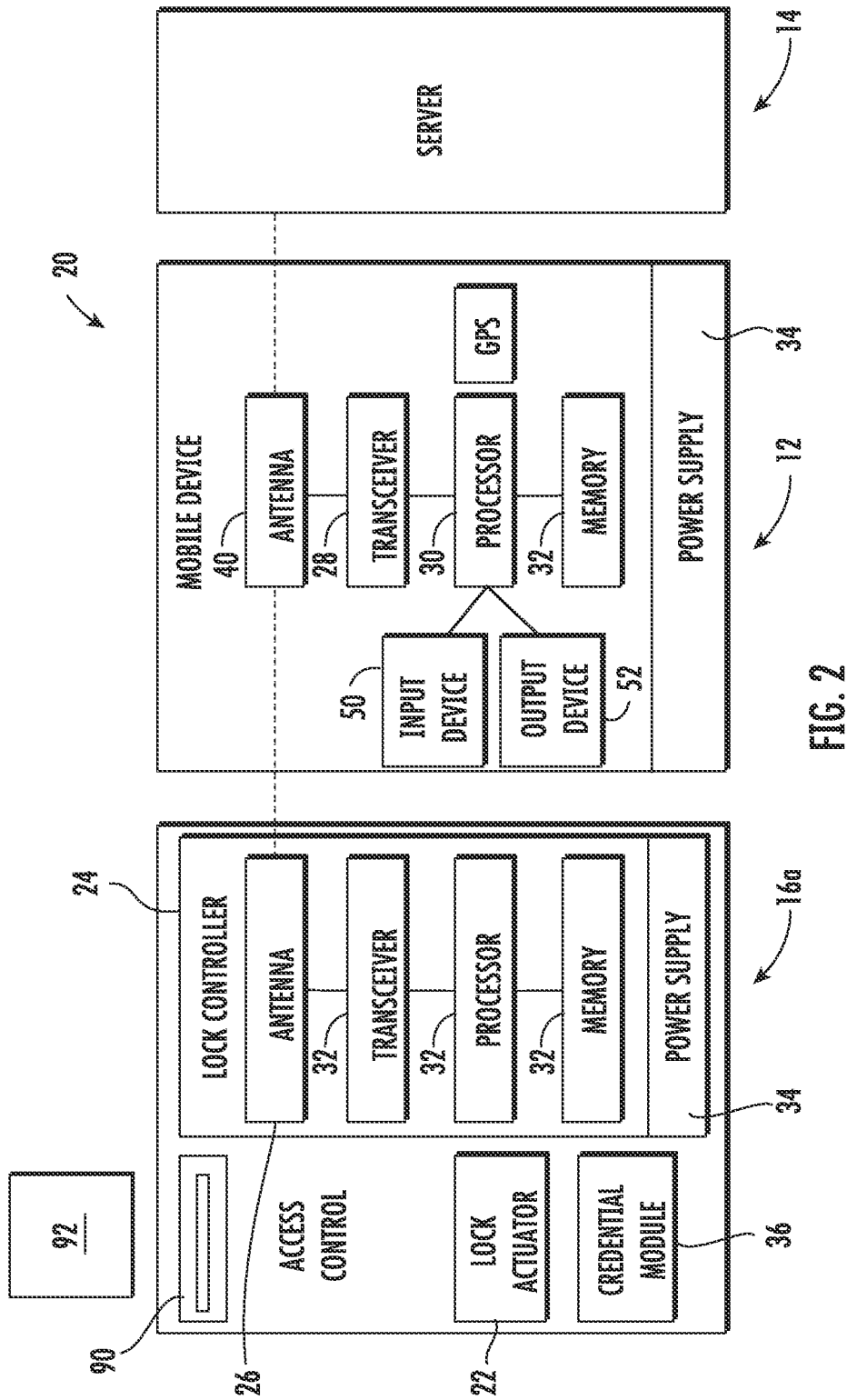
FIG. 2 is a block diagram of the access control system.

With reference to FIG. 2, a block diagram of an example electronic lock system 20 includes the access control 16a, the mobile device 12, and the server 14. The access control 16a generally includes a lock actuator 22, a lock controller 24, a lock antenna 26, a lock transceiver 28, a lock processor 30, a lock memory 32, a lock power supply 34, a lock card reader 90 and a credential module 36. The access control 16a is responsive to credentials from the mobile device 12, and may, for example, be the lock of a lockbox, a door lock, or a lock core. Although the present disclosure focuses primarily on access control, it should be appreciated that other systems wherein credentials are transmitted from a mobile device to an access control so as to identify the user to an online system or validate user access rights or permissions in an offline system will benefit herefrom. Such systems include virtual or electronic banking systems, machine operation systems, dispensing systems, and data access systems.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate card data and determine the access rights contained in the card data or to pass messages from a transceiver to a credential module 36 and to receive a response indication back from the credential module 36 with card data. The lock memory 32 may be RAM, EEPROM, or other storage medium where the lock processor 30 can read and write data including but not limited to lock configuration options and the lock audit trail. The lock audit trail may be a unified audit trail that includes events initiated by accessing the lock via the lock card reader 90 or the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

The credential module 36 is in communication with the lock processor 30 and is operable to decrypt and validate a credential to extract virtual card data communicated into the lock controller 24 as a "virtual card read." That is, the access control 16a has essentially two readers, one reader 90 to read a physical key card 92 and the credential module 36 to communicate with the mobile device 12 via the lock processor 30 and the transceiver 28 and antenna 26. In other embodiments the credential module 36 may communicate directly to the mobile device 12 through the transceiver 28.

The mobile device 12 generally includes an antenna 40, a transceiver 42, a processor 44, a memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. In other embodiments, the mobile device 12 communicates with the server 14 at the same time as it communicates to the access control 16a. This is the online configuration and, in this embodiment, a mobile credential is retrieved in real time and is passed to the credential module 36 without storing first in the key memory 46 on the mobile device 12.

Figure 3:
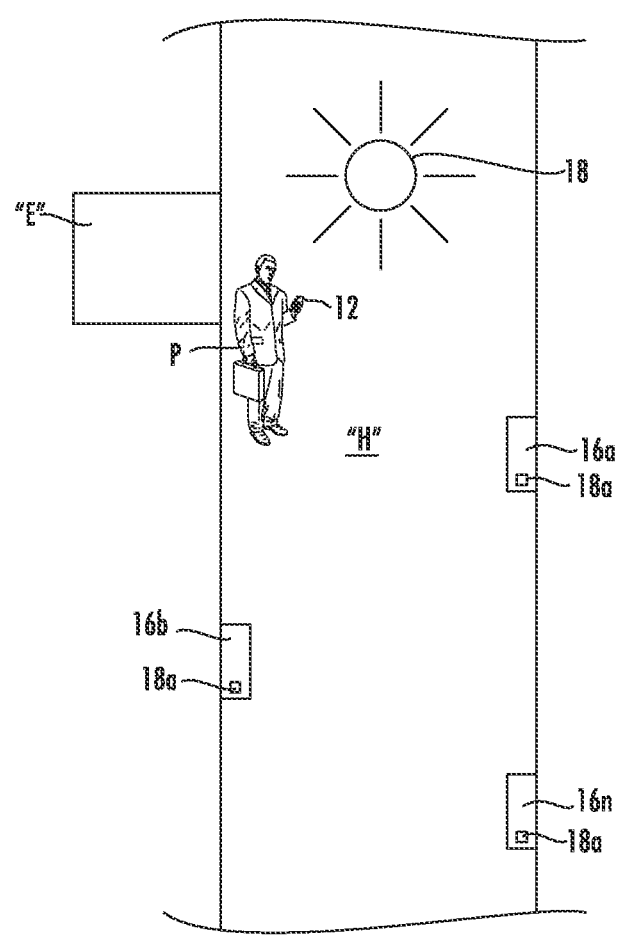
FIG. 3 is a block diagram of the access control system in which a rate of advertising is changed by a sensor.
Figure 4:
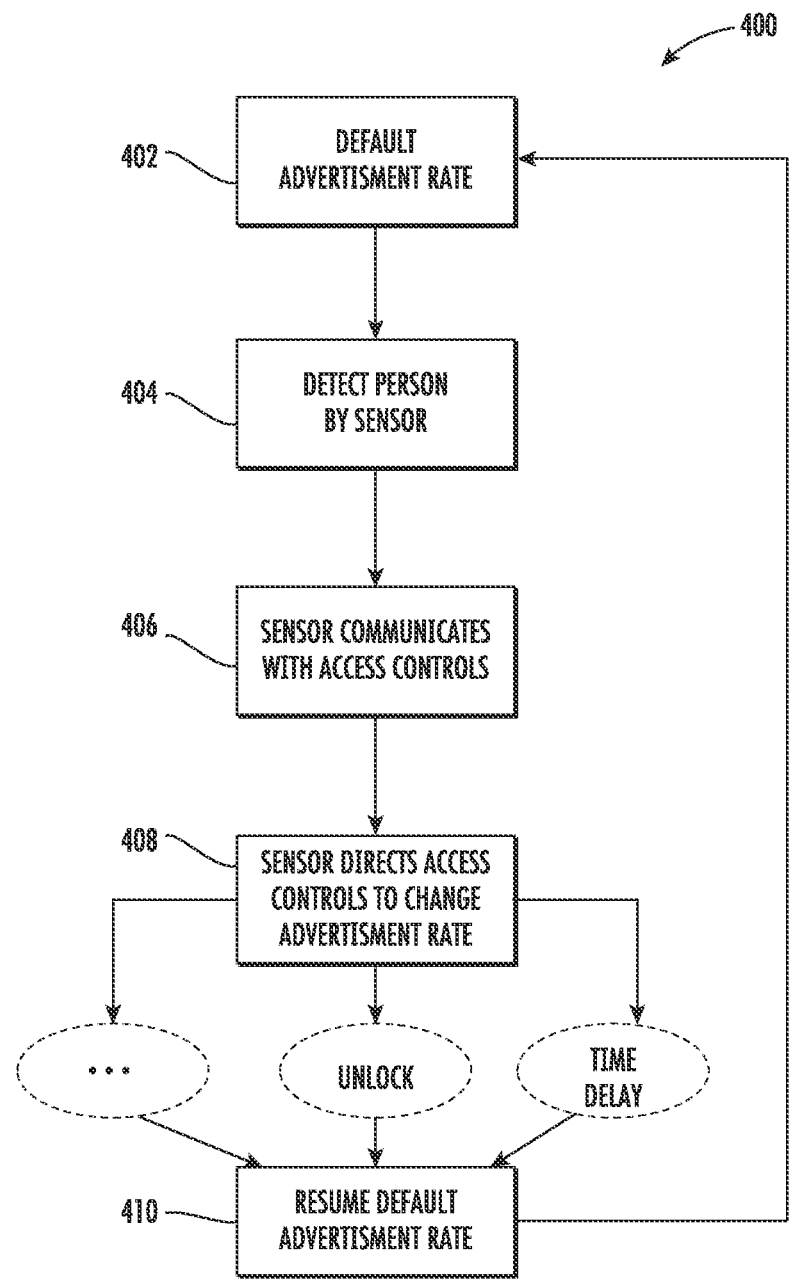
FIG. 4 is a flowchart of a method to dynamically change a rate of advertising according to one disclosed non-limiting embodiment.

With reference to FIG. 3 and FIG. 4, each access control 16 advertises using, for example, Bluetooth low energy (BTLE) which is received by the mobile device 12. Communications from multiple access controls 16 can be received because they are all in proximity to the mobile device 12, or they are transmitting at a high enough power that they are within a distance from the mobile device 12 to be received. Each of the multiple of access controls 16 changes its advertising performance in response to the sensor 18. That is, the rate of advertising is changed, i.e. the advertising rate, rate, transmit power, etc., in response to detection of a person "P" by the sensor 18 such that overall average power consumption provides for longer battery life within the access control 16, while also providing for peak time periods where the lock performance is increased to facilitate higher user satisfaction.

The sensor 18 may be a security camera, or motion detector, radar, passive infrared, ultrasonic, RF field disturbance, sound, seismic, or any other types of sensor that can distinguish motion or movement nearby, or other device that may already be installed in location with a predefined field of view, for example, in a hallway "H" adjacent to an elevator "E". The sensor 18 may typically include, a processor, a memory, and input/output device, then may include or be modified to include a Bluetooth low energy (BTLE) module or other communication device that communicates with the access control 16. Alternatively, the sensor 18 may be a camera 18a located in each of the access controls 16. Each of the multiple of access controls 16 are in communication with the sensor 18 directly through Bluetooth low energy (BTLE) such that the multiple of access controls 16 change their advertising rate in response to a detection by the sensor 18. Alternatively, the sensor 18 communicates with the multiple of access controls 16 via the server 14 which in turn changes the rate of advertising for the multiple of access controls 16 in response to a detection by the sensor 18.

With reference to FIG. 4, in one embodiment, a method 400 of communication initially includes a slow communication rate set as a default (step 402). Alternatively, the communication rate may be set based on other variables such as a time of day. The slow communication rate may be, for example, one (1) communication every two (2) seconds that results in a 2.8 year battery life (FIG. 5). It should be appreciated that relative terms such as "nominal," "fast," "slow," etc., may be defined by various characteristics and are utilized herein with respect to one another and are not otherwise limiting.

Then, in response to detection of motion and/or a person "P" by the sensor 18 (step 404), such as when a person "P" exits an elevator "E" into a hallway "H" (FIG. 3) and enters the field of view of the sensor 18, the sensor 18 will communicate the detection to the multiple of access controls 16 (step 406). That is, the detection of a person can be equivalent to detecting motion. Alternatively, detection can be performed via image processing to determine that a person is indeed in the field of view.

The sensor 18 may communicate directly with the multiple of access controls 16 via Bluetooth low energy (BTLE). That is, the sensor 18 can advertise via Bluetooth low energy (BTLE) such that the multiple of access controls 16 respond thereto. Alternatively, the sensor 18 can connect via Bluetooth to each access control 16 and send a message or write to a Bluetooth characteristic to indicate the detection. Further, this connection and sending of a message may be secured by previously pairing the Bluetooth sensor 18 and access control 16. Alternatively, the sending of a message may be secured by encrypting the message. Alternately, the sensor 18 will communicate the detection to the multiple of access controls 16 via the server 14 where the server has a means of communicating a message to the access controls 16 via a network connection or other typical communication means.

The communication rate is then changed (step 408) to a faster rate such as four (4) communications per second, or a nominal rate, which may be beneficial for lock open response times.

Then, after a predetermined time when no person "P" is detected by the sensor 18, or by other variables, the communication rate may be changed (step 410) to a slower rate. For example, the communication rate reverts to the slow rate after a predetermined time in which the sensor 18 does not detect any persons, which may be beneficial during the night for overall lower use of the energy from the batteries 34 in the lock 16. Alternatively, or in addition, the communication rate reverts to the slow rate after the access control 16 is activated or there is a recent door open/closed event.

The result may be an overall increased battery life because of energy saved during times of slower advertising as compared to additional energy used during times of optimal performance.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

The invention claimed is:

1. A method of changing a rate of advertising from an access control, comprising:
transmitting Bluetooth low energy (BTLE) advertisements receivable by a mobile device from an access control at an advertisement rate corresponding to a slow rate; and
changing the slow rate in response to detection of a person by a sensor in communication with the access control, wherein changing the slow rate in response to the detection comprises changing the advertisement rate, wherein changing the slow rate in response to the detection comprises changing the slow rate to a faster rate for a predefined period of time.

2. The method as recited in claim 1, wherein changing the slow rate in response to the detection comprises increasing the advertisement rate.

3. The method as recited in claim 1, wherein the detection comprises a video input.

4. The method as recited in claim 1, wherein the detection comprises an input from a security camera.

5. The method as recited in claim 1, wherein changing the slow rate in response to the detection comprises changing the slow rate to a nominal rate for a predefined period of time.

6. The method as recited in claim 1, further comprising reverting to the slow rate after predefined period of time subsequent to the detection.

7. The method as recited in claim 1, further comprising reverting to the slow rate after an access control unlock event.

8. The method as recited in claim 1, further comprising changing to a nominal rate between the slow rate and a fast rate after a time period subsequent to the detection, prior to reverting to the slow rate after a time period subsequent to the detection.

9. The method as recited in claim 1, wherein the sensor is in communication with the access control via Bluetooth low energy (BTLE).

10. The method as recited in claim 1, wherein the sensor is in communication with a multiple of access controls.

11. The method as recited in claim 10, wherein the multiple of access controls are located in a hallway.

12. The method as recited in claim 11, further comprising locating the sensor adjacent to an elevator.

13. An access control system, comprising:
a sensor operable to detect motion; and
an access control in communication with the sensor, the access control operable to transmit Bluetooth low energy (BTLE) advertisements receivable by a mobile device at a slow rate; and to change the slow rate in response to detection of a person by the sensor to a faster rate for a predefined period of time.

14. The system as recited in claim 13, wherein the access control is one of a multiple of access controls.

15. The system as recited in claim 14, wherein the multiple of access controls are located along a hallway.

16. The system as recited in claim 15, further comprising locating the sensor adjacent to an elevator.

17. The system as recited in claim 13, wherein the sensor is a security camera.

18. The system as recited in claim 13, wherein the sensor is in communication with the access control via Bluetooth low energy (BTLE).

19. The system as recited in claim 13, wherein the sensor is within the access control.

20. The system as recited in claim 13, wherein the access control is further operable to revert to the slow rate after a predefined period of time subsequent to the detection.

* * * * *